United States Patent
Janes

(10) Patent No.: US 11,047,476 B2
(45) Date of Patent: Jun. 29, 2021

(54) AUTOMOTIVE TRUE SLAP SHIFTER DETENT PLATE

(71) Applicant: DPJ Fabricating, LLC, Hannibal, MO (US)

(72) Inventor: Daniel Patrick Janes, Hannibal, MO (US)

(73) Assignee: DPJ Fabricating, LLC, Hannibal, MO (US)

( * ) Notice: Subject to any disclaimer, the term of this patent is extended or adjusted under 35 U.S.C. 154(b) by 0 days.

(21) Appl. No.: 16/807,145

(22) Filed: Mar. 2, 2020

(65) Prior Publication Data

US 2020/0284342 A1 Sep. 10, 2020

Related U.S. Application Data

(60) Provisional application No. 62/919,218, filed on Mar. 2, 2019.

(51) Int. Cl.
*F16H 61/24* (2006.01)

(52) U.S. Cl.
CPC ....... *F16H 61/24* (2013.01); *F16H 2061/247* (2013.01)

(58) Field of Classification Search
CPC .......................... F16H 61/24; F16H 2061/247
See application file for complete search history.

(56) References Cited

U.S. PATENT DOCUMENTS

| | | | |
|---|---|---|---|
| 3,941,008 A | | 3/1976 | Cambria |
| 4,118,999 A | * | 10/1978 | Bieber ................... F16H 59/10 |
| | | | 74/473.23 |
| 4,949,591 A | | 8/1990 | Roelle |
| 5,220,984 A | | 6/1993 | Ruiter |
| 5,398,565 A | | 3/1995 | Brock |
| 5,400,673 A | | 3/1995 | Brock |
| 5,775,165 A | | 7/1998 | Lu |
| 5,799,538 A | | 9/1998 | DeJonge et al. |
| 5,924,540 A | | 7/1999 | Kim |
| 5,993,353 A | | 11/1999 | Chung |
| 6,508,090 B1 | | 1/2003 | Hasegawa et al. |
| 6,575,049 B1 | | 6/2003 | Hasegawa |
| 6,789,444 B2 | | 9/2004 | Fujiwara et al. |
| 7,654,168 B2 | | 2/2010 | O'Brien et al. |
| 8,459,136 B1 | * | 6/2013 | Thomson ................ F16H 61/24 |
| | | | 74/473.23 |
| 9,209,729 B2 | | 12/2015 | Maruo et al. |
| 10,086,924 B2 | | 10/2018 | Crandall-Seibert et al. |
| 10,138,999 B2 | | 11/2018 | Yamada |
| 10,746,289 B2 | | 8/2020 | Sakaguchi et al. |

* cited by examiner

*Primary Examiner* — Vicky A Johnson
(74) *Attorney, Agent, or Firm* — Qpatents

(57) ABSTRACT

A shifter detent plate configured to be installed within the shifter assembly of an automatic transmission has a shifter arm attached to a shifter handle to operably control gear shifting of an automatic transmission. The shifter detent plate has an upper stop surface positioned to enable slap shifting from first gear to second gear, and from second gear to third gear.

10 Claims, 5 Drawing Sheets

$V_F = 229_{WIDTH} / 211_{WIDTH}$

US 11,047,476 B2

AUTOMOTIVE TRUE SLAP SHIFTER DETENT PLATE

CROSS-REFERENCE TO RELATED APPLICATIONS

The present application claims priority from, and incorporates by reference in its entirety, provisional U.S. patent application 62/919,218 filed Mar. 2, 2019.

BACKGROUND

Technical Field

Various embodiments of the present invention relate to shifter mechanisms for automatic transmissions in vehicles. More particularly, the present invention pertains to detent plates in automatic transmission shifter mechanisms.

Description of Related Art

Cars with an automatic transmission can be shifted manually from first gear to second gear then to drive in a manner similar to a manual transmission—except without the need to use a foot clutch. For example, classic Chevrolet models from the late 60s and early 70s may be shifted in this manner. Included among these classic Chevrolet models are the Chevelle, Camaro, Monte Carlo, Impala, El Camino. The Chevelle shifter assembly 100 of FIG. 1 is typical of a shifter in a late 60s/early 70s Chevrolet automatics. These classic cars were sold with a three-speed automatic transmission (e.g., models TH350 or TH400).

FIG. 1A is an oblique view of a factory-made conventional shifter assembly 100. The shifter assembly 100 is generally positioned within the car just to the right of the driver's seat, in line with the transmission along the center plane of the car. This makes the shifter handle 103 readily accessible to the driver's right hand. The various parts of the shifter assembly 100 are attached to a shifter base plate 115, which in turn is bolted to the floor pan of the car through bolt holes in shifter base plate 115. Of course, the various car models have different interior dimensions, console shapes and trim pieces. To accommodate the various interior designs, different shaped shifter base plates 115 are specifically adapted to fit the layout of each specific car model's interior. However, the shifter assemblies 100—and in particular, the conventional stock detent plates 101—all work in basically the same manner for each late 60s/early 70s car model and year. The shifter arm 107 on each side is connected to shifter base plate 115 by bolt 109. As the driver pushes forward on shifter handle 103 the shifter arm 107 rotates around the shifter pivot point 990 which coincides with the center axis of bolt 109.

The driver shifts to a higher gear by pushing shifter handle 103 forward from first gear "1" to second gear "2", then to third gear "3" (sometimes labeled as drive "D"). As shown in FIG. 1A the shifter assembly 100 has a detent plate 101 from the factory which is fastened to shifter base plate 115 with bolts 117a and 117b. As the driver shifts up from first "1" up to third "3" the crossbar assembly 111 rides along the detent plate 101 in angular direction 999 as shifter arm 107 rotates around shifter pivot point 990. The trigger 105 is spring loaded to maintain a downward force on the crossbar assembly 111, keeping it pressed against detent plate 101. In various models there are two springs within the shifter handle 103—one on each side—that push the trigger 105 towards the detent plate 101. Since the crossbar 111 is connected to the trigger 105 via sliding components 131 recessed into inner surfaces of shifter arms 107 (one on each side), this keeps the crossbar 111 seated on detent plate 101 as it slides across it while changing gears. As the driver shifts from second gear "2" to drive "D" the crossbar assembly 111 falls off the ledge in the detent plate 101 to reach the "D" position. As shown in FIG. 1C, if the driver pushes the shifter handle 103 further forward from drive "D" the transmission shifts into neutral "N", resting against a vertical edge of detent plate 101.

The vertical edge between neutral "N" and reverse "R" prevents a driver from accidentally shifting the car from neutral into reverse. To shift from neutral "N" to reverse "R" the driver must take hold of the shifter handle 103 and depresses trigger 105 which is connected to connector piece 113. This pulls crossbar assembly 11 away from detent plate 101, allowing the driver to move shifter arm 107 in direction 999 from neutral "N" to reverse "R." Similarly, to shift from reverse "R" to park "P" the driver must again depress the trigger 105 to lift the crossbar assembly over the small vertical segment bounding reverse "R", then push the shifter handle forward to the park "P" position.

U.S. Pat. No. 8,459,136 ("Thomson patent") to Thomson, which is incorporated herein by reference in its entirety, describes a detent plate (the "Thomson detent plate"). The Thomson patent claims that the Thomson four-speed detent plate 151 shown in FIG. 1D, and the Thomson three-speed detent plate 161 shown in FIG. 1E, are improvements over the factory detent plate 101 depicted in FIGS. 1B-C. The Thomson four-speed detent plate 151 allows a driver to slap shift from first "1" to second "2" by simply pushing on the gear shifter. A step 311 is provided to prevent accidentally shifting into third gear "3". However, detent plate 151 does not allow slap shifting from second "2" into third gear "3". To shift positively from second "2" into third gear "3" the driver must depress the trigger 105 of FIG. 1A to raise the crossbar 111 up to ceiling 315, and slide the shifter forward to move crossbar 111 along ceiling 315 and over Thomson's step 311. If the trigger 105 is not fully depressed putting crossbar 111 against ceiling 315, the driver can easily inadvertently shift through third right into drive "D". While shifting to third "3" with the trigger 105 properly depressed, once the shifter is pushed forward enough so that crossbar 111 reaches upper stop 317, the car is in third gear "3" and the driver can release the trigger 105, letting the crossbar 111 drop down again. The driver can then shift into drive "D" by pushing the shift lever forward.

Shifting the Thomson three-speed detent plate 161 (FIG. 1E) from first "1" to second "2" is similar to shifting the Thomson four-speed detent plate 151 (FIG. 1D) from second "2" to third "3". Since there is no step 311 on Thomson's three-speed detent plate 161, the driver must depress the trigger 105 to make a fast and positive upshift from first "1" to second "2" using the Thomson three-speed detent plate 161. Fully depressing the trigger 105 allows the driver to runs the crossbar 111 along the ceiling 412 until it encounters upper stop 414, putting the car in second gear "2". The driver can then release trigger 105 in second gear "2". If the driver simply pushes the shifter forward without fully depressing trigger 105 while shifting up out of first gear "1", the Thomson three-speed detent plate 161 does not provide anything to stop the shifter from going right through second gear "2" and inadvertently shifting into drive "D".

BRIEF SUMMARY

Various embodiments disclosed herein are drawn to a shifter detent plate configured to be installed within the shifter assembly of an automatic transmission vehicle. The shifter assembly has a shifter arm attached to a shifter handle with which a driver can operably control gear shifting of the automatic transmission. The shifter detent plate includes a stepped cam surface configured to support a crossbar that ride along a stepped cam surface of the detent plate. The stepped cam surface has a forward stop surface at one end and a backward stop surface at the other end. The shifter assembly has at least a first-gear position at which the automatic transmission is in first gear, a second-gear position at which the automatic transmission is in second gear, and a third-gear position at which the automatic transmission is in third gear. The detent plate is configured with an upper-stop that stops the crossbar, traveling forward from the first-gear position, at the second-gear angle of at the second-gear position. The detent plate is also configured with a vertical shift-path slot that allows the crossbar to drop down to rest upon the second-gear position floor of the of the stepped cam surface. The shifter detent plate allows the shifter assembly to be slap shifted from the first-gear position to the second-gear position, and from the second-gear position to the third-gear position.

BRIEF DESCRIPTION OF THE DRAWING

The accompanying drawings, which are incorporated in and constitute part of the specification, illustrate various embodiments of the invention. Together with the general description, the drawings serve to explain the principles of various embodiments of the invention. In the drawings.

DETAILED DESCRIPTION

Figure 1A:
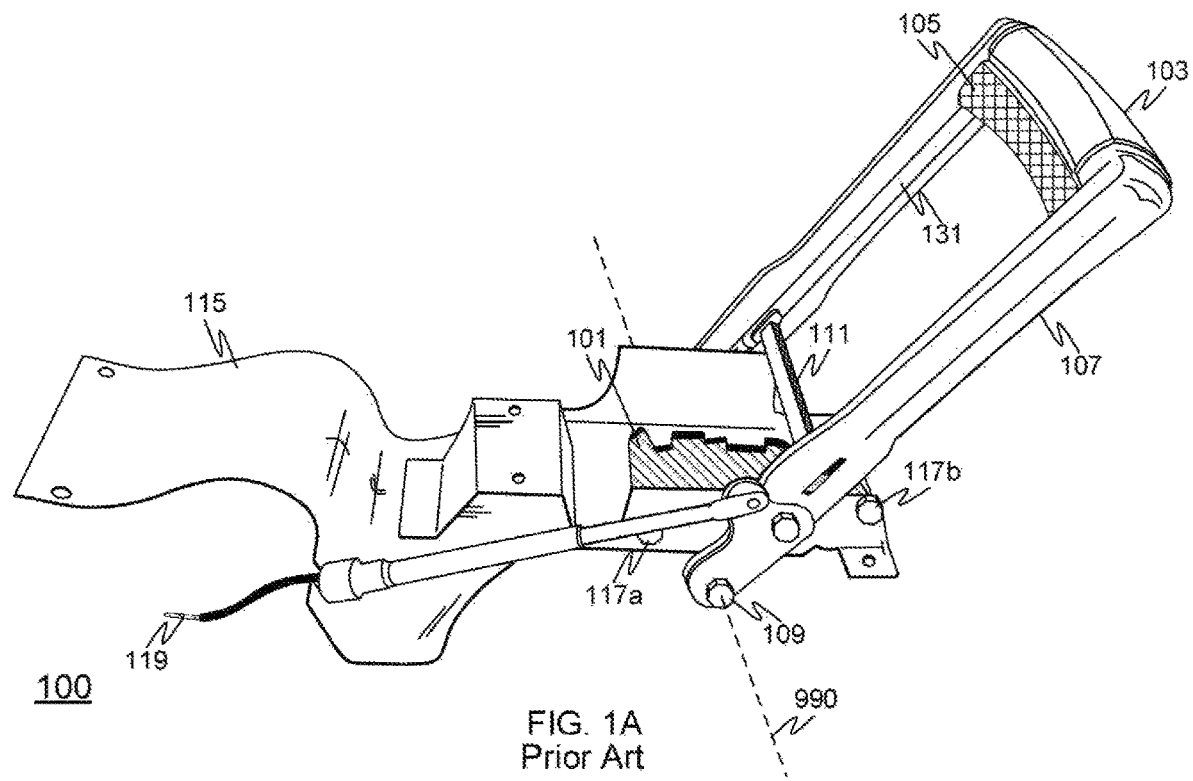
FIG. 1A is an oblique view of a factory-made conventional shifter assembly.
Figure 1B:
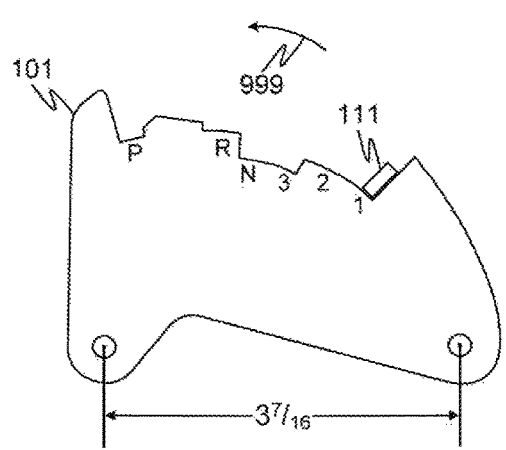
FIGS. 1B-C depict side views of a conventional detent plate which is part of the shifter assembly of FIG. 1A.
Figure 1C:
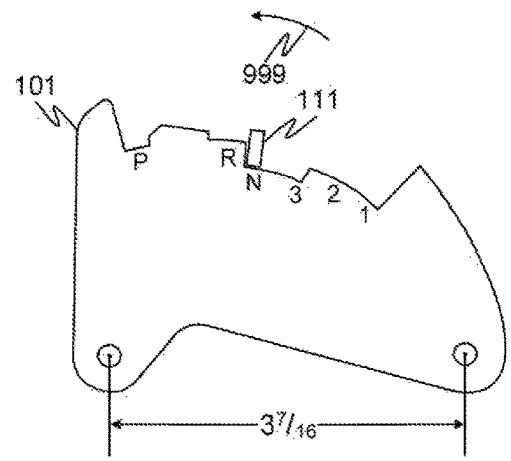
Figure 1D:
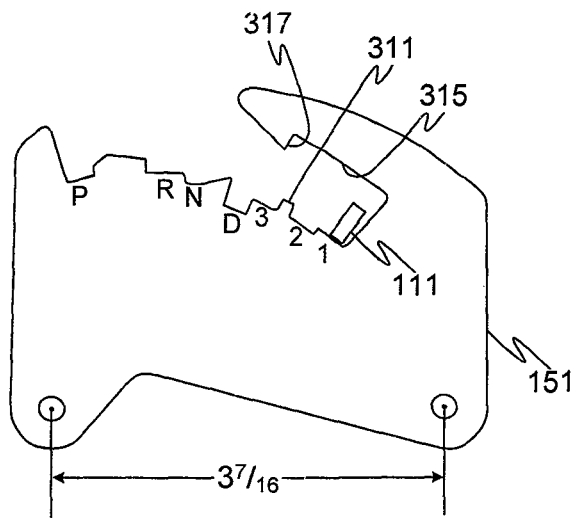
FIG. 1D depicts a side view of a conventional four-speed detent plate.
Figure 1E:
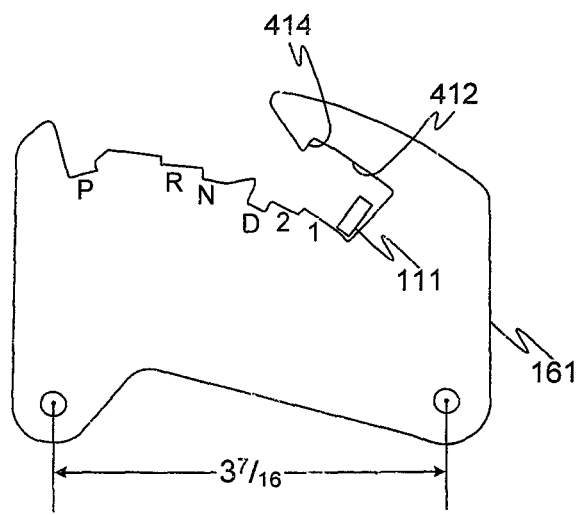
FIG. 1E depicts a side view of a conventional three-speed detent plate.

The present inventor, in his capacity as an auto mechanic and classic car restorer, recognized a need for a better shifter for vintage race cars. In particular, the present inventor recognized shortcomings of shifter kits intended to replace the factory original horseshoe shifters sold as original equipment in many 1968 and later Chevrolet cars. These shifters are commonly called horseshoe shifters due to the shape of the handles (e.g., handle 103 and shifter arm 107 of FIG. 1A). The shifter handle is adapted to move only in a linear forward or backward motion over the stepped cam surface of the detent plate contained within the shifter assembly (e.g., shifter assembly 100 of FIG. 1). The present inventor recognized drawbacks in the prior art shifter kits. Namely, the Thomson four-speed detent plate 151 discussed in the Background enables the driver to shift positively, meaning not shifting accidentally into the wrong gear or into neutral, but the Thomson shifter kit does not address the need to shift fast through the gears needed for racing. The Thomson four-speed detent plate 151 discussed in the Background allows a driver to slap shift from first gear "1" to second gear "2"—but does not allow the driver to slap shift from second "2" into third "3". Thus, the embodiments of the Thomson patent do not address a crucial need in classic car racing: to be able to rapidly slap shift through the racing gears. "Slap shifting" is shifting without the need to depress the trigger 105 of the shifter assembly 100 shown in FIG. 1A. "Shifting positively" (or "positive shifting") means to shift gears without accidentally shifting into the wrong gear or into neutral.

Very fast shifting, and positive shifting through the car's top speed, are both required in racing situations. The various embodiments disclosed herein address these needs for General Motors cars equipped with automatic transmissions from the model years 1968-73. This includes a number of Chevrolet models such as the Chevelle, Camaro, Monte Carlo, Impala and El Camino. The novel design characteristics of various shifter detent plate embodiment disclosed herein allows a user with a horseshoe shifter to very quickly and positively shift from first gear "1" to second gear "2", and then from second gear "2" to third gear "3", with only a very quick slap of the shifter handle for each shift.

Figure 2A:
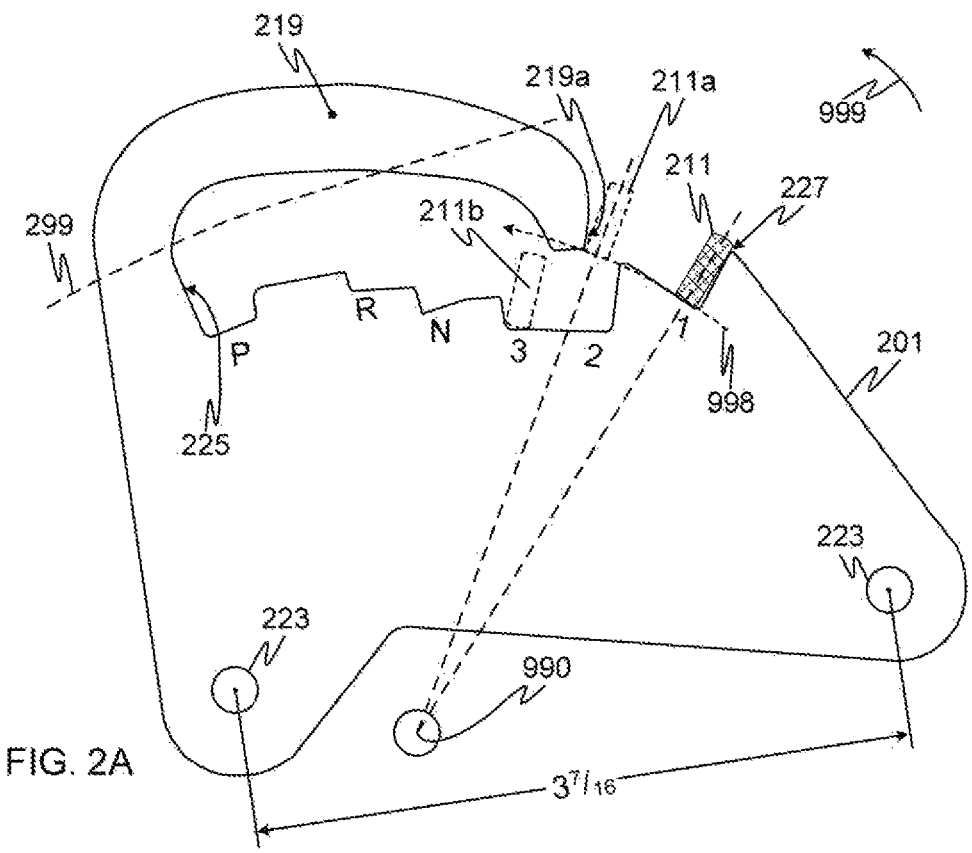
FIGS. 2A-B are side views of three-speed detent plates according to embodiments disclosed herein.
Figure 2B:
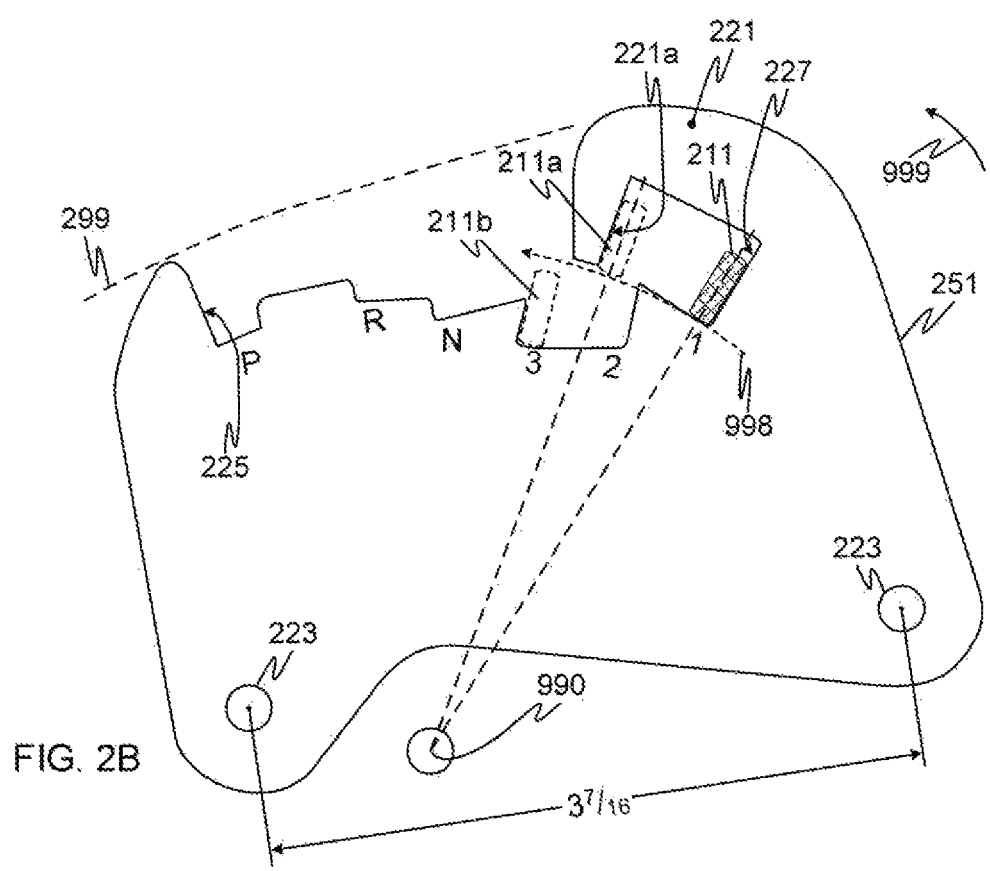
Figure 2C:
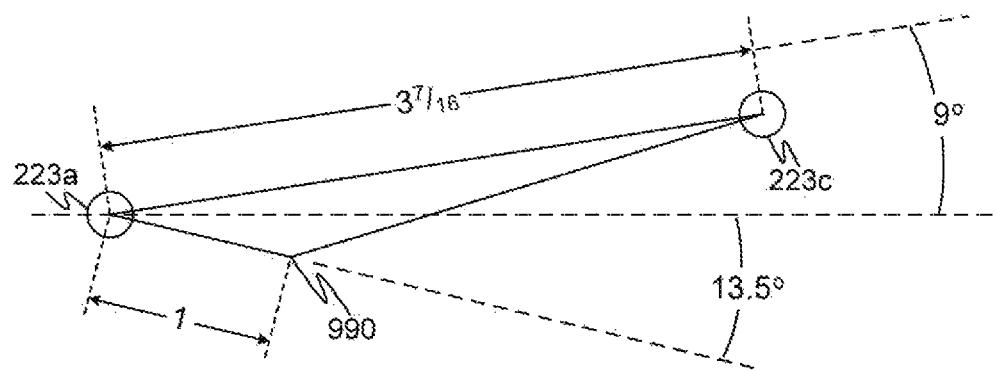
FIG. 2C depicts the relationship between the two bolt holes of the detent plate and the axis of rotation of the shifter arm, according to various embodiments disclosed herein.

FIGS. 2A-B are side views of three-speed detent plates according to two embodiments disclosed herein. The left side detent plates 201 and 251, as shown in FIGS. 2A-B, is oriented towards the front of the car. The detent plates 201 and 251 of FIGS. 2A-B are each fastened to a shifter assembly (e.g., shifter assembly 100 of FIG. 1A) by inserting bolts through the two holes at predefined points in the shifter base plate 115 and threading them into the threaded bolt holes 223. The bolt holes 223 are 3.4375 inches apart in the embodiments depicted, and are not horizontally level with respect to each other. Turning to FIG. 2C bolt hole 223a corresponds the left bolt hole 223 of FIGS. 2A-B, and bolt hole 223b corresponds the right bolt hole 223. Right bolt hole 223b is approximately 8.5 degrees up from horizontal with respect to the left bolt hole 223a. Shifter pivot point 990 is the point that the shifter arm 107 of FIG. 1A rotates about. The shifter arm 107 rotates in a plane parallel to the plane defined by a face of the detent plate 201 (or 251). The shifter pivot point 990 is 1 inch from left bolt hole 223a.

Detent plate 201 shown in FIG. 2A is a left overhang embodiment and detent plate 251 of FIG. 2B is a right overhang embodiment. Detent plate 201 is called a left overhang embodiment since its overhang component 219 extends from the left of the left-most detent plate gear position. That is, overhang component 219 extends from left of P, the left-most among the P, R, N, 3, 2, and 1 gear positions. Detent plate 251 is called a right overhang embodiment since its overhang component 221 extends from the right of the detent plate gear positions. That is, overhang component 221 extends from the right of the first gear "1" position. The first gear "1" position places the crossbar 211 is the angular position to put the transmission in first "1" gear. It's the right-most position along the stepped cam surface that supports the crossbar 211. The stepped cam surface beneath the crossbar 211 when its in the first "1" gear position is known as the first "1" gear position floor. The overhang components are configured to provide an upper stop for each embodiment. Overhang component 219 provides upper stop 219a as part of detent plate 201. Overhang component 221 provides upper stop 221a as part of detent plate 251.

Both embodiments—detent plate 201 and detent plate 251—work with either Chevrolet TH350 or TH400 turbo hydromatic (automatic) transmissions. But the dimensional constraints of some car interiors—for example, the Chevy Camaro's small sized shifter assembly housing—can cause problems for detent plates that extend above the profile of stock detent plate 101. Detent plate 201 with its left overhang 219 fits in most Chevrolet models, but won't fit in the Camaro. However, detent plate 251 with its right overhang 221 has a lower profile on its left side as shown in the figure. This can be seen by dotted line 299 shown on both FIGS. 2B and 2A for reference purposes. Detent plate 251, having a lower upper profile on its left side, is able to fit into various Chevy Camaro models, while the left overhang component 219 of detent plate 201 won't fit into the Camaro shifter assembly.

Despite the different construction of the overhangs, both detent plates 201 and 251 provide substantially the same positions for crossbar 211 that put the transmission in first gear "1", second gear "2", third gear "3", neutral "N", reverse "R" and park "P". This can be seen by comparing the positions of crossbar 211 in FIG. 2A to the crossbar 211 positions in FIG. 21. Crossbar 211 is in the same first gear "1" position in both figures relative to the shifter pivot point 990 that the shifter rotates around (shifter arm 107 of FIG. 1A). The position 211b—the third gear "3" position, labeled 211b—is also the same for both FIG. 2A and FIG. 2B. For both detent plates 201/251 the surface to the left of the park "P" gear position is a forward stop 225 (sometimes called a forward stop surface). Once the crossbar 211 reaches the forward stop 225 it can be pushed no further forward by the driver. The surface to the right of the first gear "1" position is a backward stop 227 (sometimes called a backward stop surface). Once the driver has pulled the shifter arm all the way back so the crossbar 211 rests against the backward stop 227 the shifter arm will go no farther. The surface that crossbar 211 traverses in going back and forth between forward stop 225 backward stop 227 is known as the cam surface.

In FIG. 2A, position 211a is the position of the crossbar 211 as it comes in contact with the upper stop surface 219a. The upper stop surface 219a is the portion of overhang component 219 that extends furthest to the right in FIG. 2A relative to shifter pivot point 990, thus being the first portion of overhang component 219 to come in contact with crossbar 211 as it is slapped to the left by the driver shifting from first gear "1" to second "2". In practice the crossbar 211 may be pushed slightly downward into the vertical shift-path slot toward the detent plate 201 by the springs in the shifter handle 103 (e.g., shifter handle 103). The springs push against the trigger 105 which is attached to the crossbar 211 (e.g., shifter handle 103 and trigger 105 of FIG. 1A) keeping a constant downward pressure on the crossbar 211 towards the shifter pivot point 990. However, the small amount that crossbar 211 may move downward can generally be disregarded since the crossbar 211 has a flat face—and the upper part of the crossbar 211's flat face would tend to hit at the same time as the lower part of the flat face.

Figure 3A:
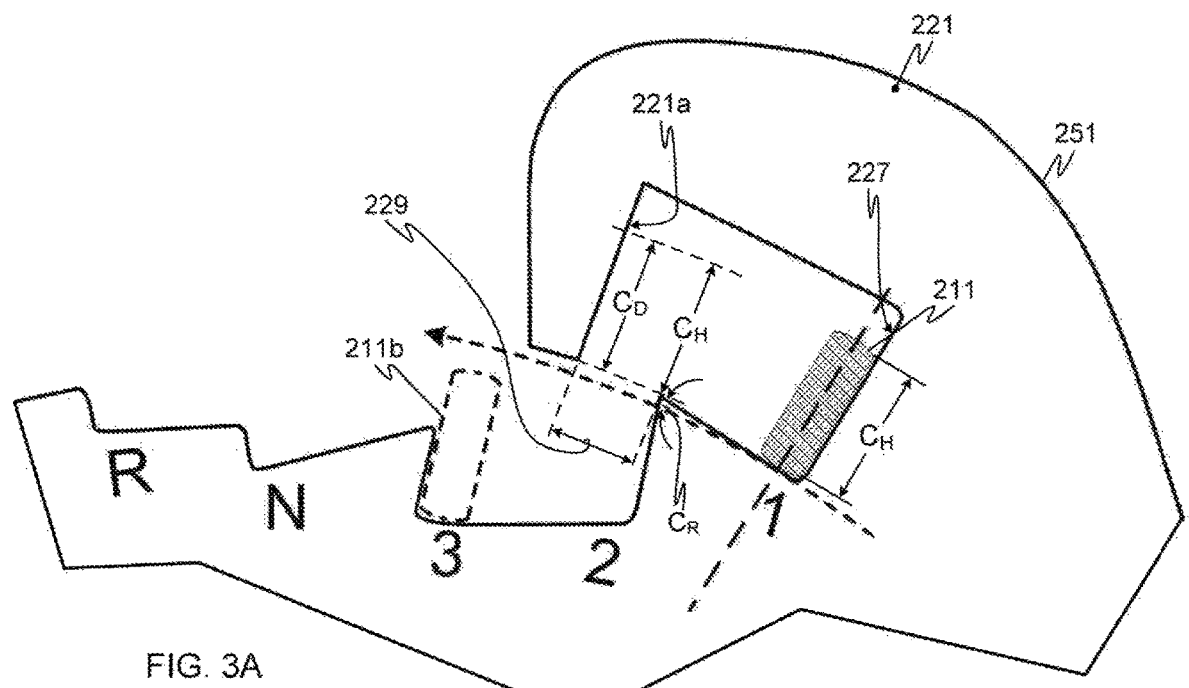
FIG. 3A depicts a cutaway view of detent plate 251 of FIG. 2B to illustrate characteristics of the cam surface according to various embodiments disclosed herein.
Figure 3B:
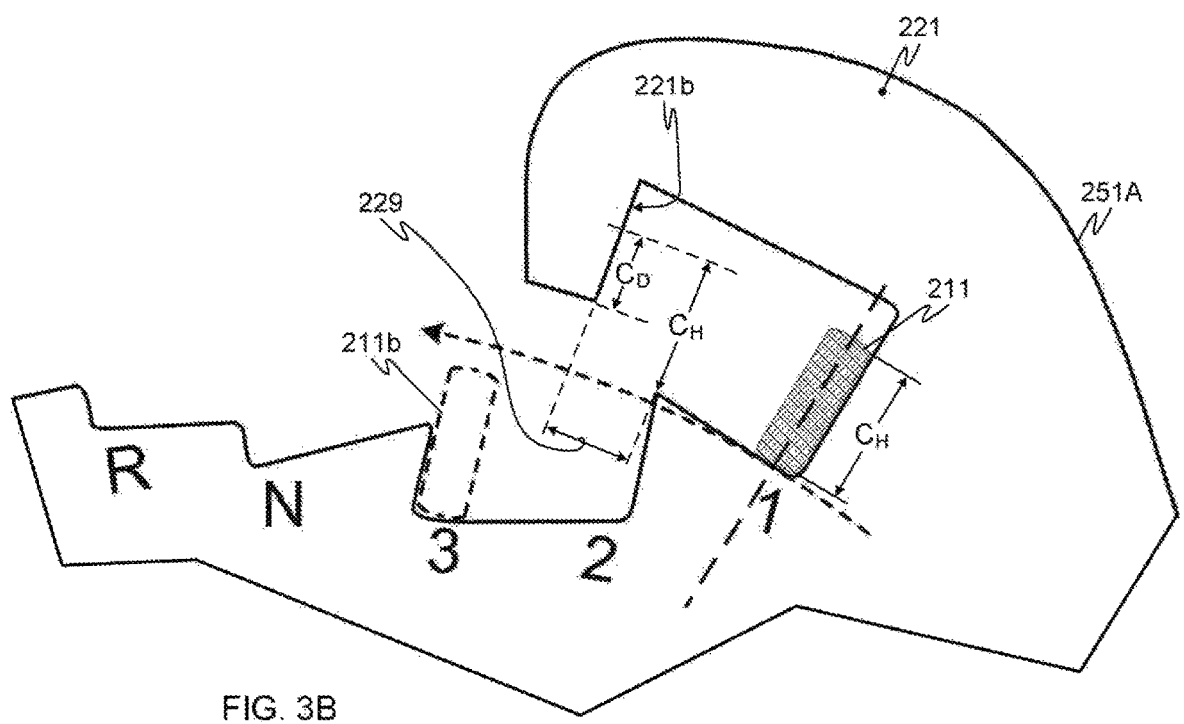
FIG. 3B depicts a cutaway view of detent plate 251A to illustrate characteristics of the cam surface according to various embodiments disclosed herein.

Detent plate 251 operates in much the same manner as detent plate 201, except the upper stop surface 221a is a flat surface that is approximately parallel to the face of crossbar 211 at position 211a. In other implementations the face 221a is not limited to being entirely flat or parallel to crossbar 211—so long as the crossbar 211 is in the second gear "2" position upon being stopped by upper stop surface 221a. The upper stop surface 221a allows a driver to rapidly and positively shift from first gear "1" to second gear "2" by slapping the horseshoe shifter's shift handle 103 forward without need to squeeze the trigger 105. Detent plate 201 operates in the same manner. Once the car is in second gear the crossbar 211 falls into the vertical shift-path slot 229, as shown in FIGS. 3A-B. It could be said that the crossbar 211 is pushed downward rather than falls downward, since the shifter handle contains springs pushing downward on the trigger (e.g., trigger 105) which is rigidly connected to the crossbar 211.

FIG. 3A depicts a cutaway view of detent plate 251 to illustrate characteristics of the cam surface according to various embodiments disclosed herein. $C_R$ is the ramp angle of the gear "1" position cam surface. The ramp angle $C_R$ depicted in FIG. 3A is approximately 4.5 degrees. In various embodiments the ramp angle $C_R$ may be as little as 0 (zero) degrees to as much as 45 degrees. In general, increases in the ramp angle causes increases in the friction between the detent plate and the crossbar. Therefore, the ramp angle $C_R$ is typically kept under 30 degrees. In various embodiments the ramp angle $C_R$ is from 2 degrees to no greater than 15 degrees. In other embodiments the ramp angle $C_R$ is from 2 degrees to no greater than 10 degrees.

As the driver shifts from first gear "1" to second gear "2" the crossbar 211 moves to the left from its resting position against the backward stop 227 in the first gear "1" angular position. If the driver is slap shifting into second gear "2" the crossbar 211 moves rapidly to the left, slamming against the upper stop surface 221a, putting the transmission into second gear "2". The transmission shifts into second gear "2" upon the crossbar 211 reaching the second gear "2" angular position (labeled with a 2 on FIG. 3A). Since the driver is slap shifting the shifter assembly he has not depressed the trigger (e.g., trigger 105 of FIG. 1A). Therefore, the spring-loaded crossbar 211 slides down into vertical shift-path slot 229. The vertical shift-path slot 229 is defined by upper stop surface 221a on its left and the 2-1 step on its right. The 2-1 step is the vertical surface just to the right of the second gear "2" angular position. The vertical shift-path slot factor $V_F$ is defined as the width of the vertical shift-path slot 229 divided by the width of the crossbar 211, $C_W$. Detent plate 251 depicted in FIG. 3A has a vertical shift-path slot factor $V_F$ 1.66. Various embodiments disclosed herein have a vertical shift-path slot factor $V_F$ within the range of from 1.1 to as much as 3.0, or any range or value within these two extremes. Other embodiments have a vertical shift-path slot factor $V_F$ within the range of from 1.25 to as much as 2.5. Yet other embodiments have a vertical shift-path slot factor $V_F$ within the range of from 1.35 to as much as 2.25.

The crossbar height $C_H$ is the height of the flat side surface of crossbar 211. Since the top and bottom of crossbar 211 are slightly rounded so as to slide more easily along the detent plate cam surface, the crossbar height $C_H$ is slightly less than the overall height of the crossbar 211. The cam drop distance $C_D$ in FIG. 3A is the distance from the top of crossbar 211 just before it drops off the edge of the 2-1 step down to the bottom edge of upper stop surface 221a. FIG. 3A is not particularly illustrative of the cam drop $C_D$ since $C_D$ and the cam height $C_H$ are the same. Referring to FIG. 3B, the upper stop surface 221b does not extend down as far as upper stop surface 221a of FIG. 3A. As a result it is easier to see the cam drop $C_D$ in FIG. 3B. The cam drop $C_D$ may be defined as a cam drop factor $C_{DF}$ by expressing it in dimensionless terms of the crossbar height $C_H$. In FIG. 3A the cam drop factor $C_{DF}$ equals 1.0 since the cam drop $C_D$ equals the crossbar height $C_H$. In FIG. 3B the cam drop factor $C_{DF}$ equals approximately 0.55 since the cam drop $C_D$ is approximately 55% of crossbar height $C_H$. In various embodiments the cam drop factor $C_{DF}$ may be within any of several ranges. For example, in various embodiments the cam drop factor $C_{DF}$ may be from 0.35 to 1.5; or any range or amount within 0.35 to 1.5. In other embodiments the cam drop factor $C_{DF}$ may be from 0.5 to 1.2; from 0.65 to 1.25; from 0.75 to 1.5; or from 0.80 to 1.75.

Figure 4:
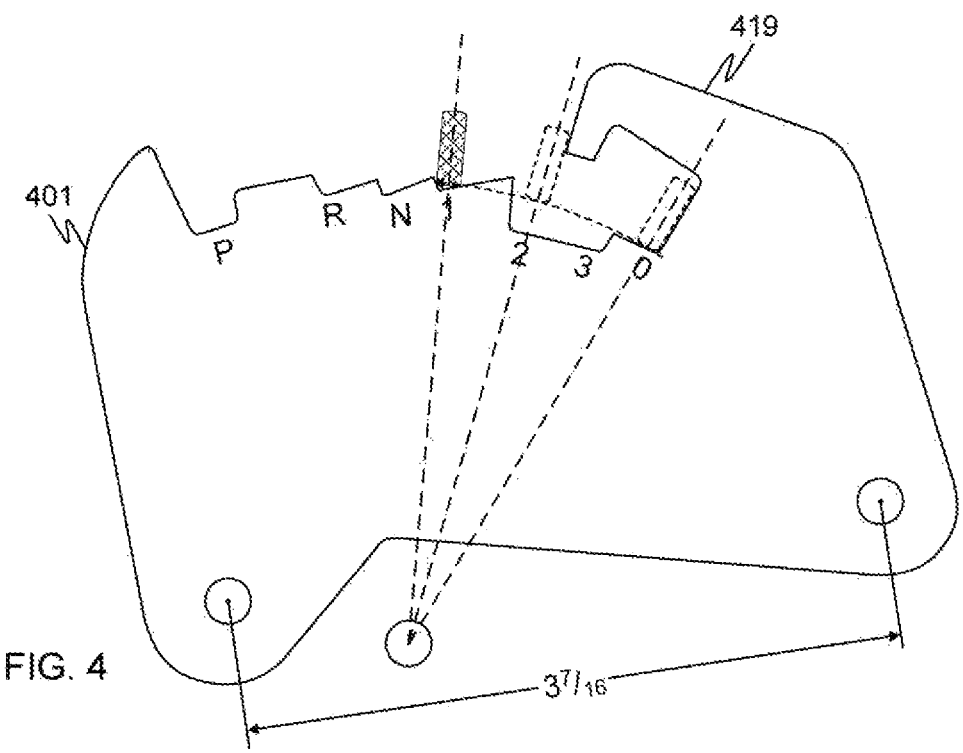
FIG. 4 depicts a side view of a detent plate embodiment for a four-speed reverse manual valve body transmission according to embodiments disclosed herein.

FIG. 4 depicts a side view of detent plate 401 which is configured for a four-speed reverse manual valve body transmission according to embodiments disclosed herein. Some drag racers prefer to pull the gear shift lever back to shift into higher gears rather than pushing it forward. To achieve this they alter the valve configuration inside their transmission to reverse the order of the valves for gears "1", "2", "3" and "O" (overdrive). Thus, the angular position where the shifter would normally be in first gear "1" becomes "O" overdrive; the angular position normally for second gear "2" becomes third gear "3"; the angular position normally for third gear "3" becomes second gear "2"; and the angular position normally for overdrive "O" becomes first gear "1". This allows them to have the angular gear positions for "1", "2", "3" and "O" illustrated in FIG. 4 for the four-speed reverse manual valve body transmission detent plate 401. In this way, the driver can pull back on the shift lever to upshift from "1" to "2" and then to "3". The overdrive gear "O" is not typically used in racing. Therefore a step is provided to prevent the driver from inadvertently shifting into overdrive "O". FIG. 4 depicts detent plate 401 with right overhang 419. In other implementations similar results are achieved with a left overhang detent plate.

The various embodiments are drawn to a detent plate for a shifter assembly. It should be noted that automatic transmissions typically also include a detent plate contained within the automatic transmission housing. The detent plate embodiments described herein are not to be confused with the detent plate contained within the automatic transmission itself. To avoid confusion and more specifically identify the various embodiments disclosed herein, the detent plate for a shifter assembly may be referred to as a "shifter detent plate".

The cam surface is the surface that crossbar 211 traverses in going back and forth between forward stop 225 backward stop 227 is known as the cam surface as shown in FIGS. 2A-B. The steps of the cam surface are labeled by nomenclature of using the closest angular gear position at the bottom of the step separated by a dash ("-") from the closest adjacent angular gear position at the top of the step. For example, moving left from backward stop 227 the crossbar 211 first encounters cam step 2-1 (i.e., "2" is at the bottom of the step and "1" is the adjacent gear position at the top of the step). Continuing left, next the cam step 3-N is encountered. After that are the N-R, R-P and P-R cam steps. The surface going up the step is labeled the step name—for example, the 2-1 step surface is the vertical surface from the bottom to the top of the 2-1 cam step. An arbitrary distinction of 45 degrees is chosen to distinguish between cam steps and cam ramps. If a cam surface is less than 45 degrees it is considered a cam ramp, as that term is used herein. If a surface is 45 degrees or greater it is considered a cam step, as that term is used herein.

The Detailed Description discusses various detent plate bodies for General Motors cars equipped with automatic transmissions from the model years 1968-73, including the Chevrolet Chevelle. Camaro, Monte Carlo, Impala and El Camino models. However, the concept and novel characteristics of the various detent plate embodiments disclosed herein may be applied more broadly to automatic transmissions found in other GM models and vehicles made by other manufacturers. For example, the various embodiments may be used in the shifter assemblies of four-speed automatic transmissions such as the TH700r4, TH200-4r, 4L60E, 4L80E or other three or four-speed automatic transmissions known to those of skill in the art. The inventive concepts of the various embodiments disclosed herein may be adapted by changing the dimensions and angular gear positions to accommodate other motorized vehicles such as trucks, buses, vans or the like made by any manufacturer, as known to those of ordinary skill in the art.

The stepped cam surface beneath the crossbar in the first "1" gear position is known as the first gear position floor. The line passing through shifter pivot point 990 (e.g., pivot point 990) and the center of crossbar (e.g. crossbar 211) in the first "1" gear position is at an angle with respect to horizontal known as the first-gear angle. The stepped cam surface beneath the crossbar in the second "2" gear position is known as the second gear position floor. The line passing through shifter pivot point 990 and the center of crossbar in the second "2" gear position is at an angle with respect to horizontal known as the second-gear angle. The stepped cam surface beneath the crossbar in the third "3" gear position is known as the third gear position floor. The line passing through shifter pivot point 990 and the center of crossbar in the third "3" gear position is at an angle with respect to horizontal known as the third-gear angle. The stepped cam surface beneath the crossbar in the neutral "N" position is known as the neutral position floor. The line passing through shifter pivot point 990 and the center of crossbar in the neutral position is at an angle with respect to horizontal known as the neutral angle. The stepped cam surface beneath the crossbar in the reverse "R" gear position is known as the reverse gear position floor. The line passing through shifter pivot point 990 and the center of crossbar in the reverse "R" gear position is at an angle with respect to horizontal known as the reverse-gear angle. The stepped cam surface beneath the crossbar in the park "P" position is known as the park position floor. The line passing through shifter pivot point 990 and the center of crossbar in the park "P" position is at an angle with respect to horizontal known as the park angle.

A given line is a "substantially straight-line" if it does not vary by more than +/−5% from a straight-line path. The straight-line path used to determine this is the average straight-line path drawn through the distance covered by the given line. The average straight-line path is the straight line that has the smallest average distance between the itself and all adjacent points along the given line (disregarding the +/− signs of the differences—that is, plus and minus differences don't offset each other.) To determine whether the given line is a substantially straight-line, first the average straight-line path is drawn through the distance covered by the given line. Then the average straight-line path is measured to determine 5% of its length, and boundaries are drawn 5% above and below the average straight-line path. If the given line remains within these boundaries it is a "substantially straight-line". (Note: The beginning and ending points of the given line and the average straight-line path need not necessarily coincide.)

The corresponding structures, materials, acts, and equivalents of all means elements in the claims below are intended to include any structure, material, or connection in combination with other claimed elements as claimed. The description of the present invention has been presented for purposes of illustration and description, but is not intended to be exhaustive or limited to the invention in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated.

Design variations, including changes to the orientation and connection of the various shifter assembly components, their relative size or direction of motion, and other such variations, are considered to be included as part of the various embodiments disclosed herein without departing from the scope and intent of this invention.

What is claimed is:

1. A shifter detent plate configured to be installed within a shifter assembly having a shifter arm attached to a shifter handle to operably control gear shifting of an automatic transmission, the shifter detent plate comprising:
    a stepped cam surface configured to support a crossbar;
    a forward stop surface at a first end of the stepped cam surface;
    a backward stop surface at a second end of the stepped cam surface opposite the first end of the stepped cam surface;
    a first-gear position configured to support the crossbar and put the automatic transmission into first gear, the first-gear position being at a first-gear position floor of the stepped cam surface and being at a first-gear angle from a pivot point of the shifter arm;
    a second-gear position configured to support the crossbar with the automatic transmission in second gear, the second-gear position being at a second-gear position floor of the stepped cam surface and being at a second-gear angle from said pivot point;
    an upper-stop configured to stop the crossbar, traveling forward from the first-gear position, at the second-gear angle of the second-gear position; and
    a vertical shift-path slot that allows the crossbar to drop down to rest upon the second-gear position floor of the of the stepped cam surface;
    wherein the vertical shift-path slot has a vertical shift-path slot factor $V_F$ within a range of from 1.25 to as much as 2.5.

2. The shifter detent plate of claim 1, further comprising:
    a third-gear position configured to support the crossbar with the automatic transmission in third gear, the third-gear position being at a third-gear position floor of the stepped cam surface and being at a third-gear angle from the pivot point.

3. The shifter detent plate of claim 2, wherein the shifter detent plate allows the shifter assembly to be slap shifted from the first-gear position to the second-gear position;
    wherein the shifter detent plate allows the shifter assembly to be slap shifted from the second-gear position to the third-gear position.

4. The shifter detent plate of claim 1, further comprising:
    a substantially vertical step between the first-gear position floor and the second-gear position floor;
    wherein a face of the substantially vertical step defines a side of the vertical shift-path slot.

5. The shifter detent plate of claim 4, further comprising:
    two holes a predefined distance apart suitable for being mounted on a shifter base plate.

6. The shifter detent plate of claim 5, wherein the two holes are threaded holes.

7. The shifter detent plate of claim 1, wherein the vertical shift-path slot has a vertical shift-path slot factor $V_F$ within a range of from 1.35 to as much as 2.25.

8. The shifter detent plate of claim 7, wherein the vertical shift-path slot has a cam drop factor $C_{DF}$ within a range of from 0.75 to as much as 1.5.

9. The shifter detent plate of claim 8, further comprising:
    an overdrive-gear position configured to support the crossbar with the automatic transmission in an overdrive gear, the overdrive-gear position being at an overdrive-gear position floor of the stepped cam surface and being at an overdrive-gear angle from the pivot point.

10. The shifter detent plate of claim 1, further comprising:
    a ramped section of the stepped cam surface between the first-gear position floor and the second-gear position floor.

* * * * *